United States Patent [19]

Forbis et al.

[11] Patent Number: 5,414,962
[45] Date of Patent: May 16, 1995

[54] REMOVABLE SASH WINDOW CONSTRUCTION HAVING RELEASABLE GUIDE MEMBERS

[75] Inventors: John T. Forbis, Gibsonia, Pa.; David Klimek, Dubuque, Iowa; Jeffrey V. Miller, Shreve, Ohio

[73] Assignee: Chelsea Industries, Inc., Boston, Mass.

[21] Appl. No.: 282,775

[22] Filed: Jul. 29, 1994

Related U.S. Application Data

[63] Continuation of Ser. No. 989,159, Dec. 11, 1992, abandoned, which is a continuation of Ser. No. 611,993, Nov. 9, 1990, abandoned.

[51] Int. Cl.⁶ .............................................. E05D 15/16
[52] U.S. Cl. ......................................... 49/454; 49/414; 49/419; 49/430; 49/446
[58] Field of Search ................ 49/454, 453, 446, 445, 49/419, 414, 161, 176, 429, 430; 156/244.24

[56] References Cited

U.S. PATENT DOCUMENTS

| | | | |
|---|---|---|---|
| 2,952,048 | 9/1960 | Graham | 49/454 X |
| 3,195,194 | 7/1965 | Young, Jr. | 49/446 |
| 3,498,000 | 3/1970 | Nobes | 49/454 X |
| 3,499,248 | 3/1970 | Baer | 49/446 X |
| 3,724,131 | 4/1973 | Schnormeier | 49/446 X |
| 4,170,090 | 10/1979 | Wood | 49/176 |
| 4,283,883 | 8/1981 | Sterner, Jr. | 49/454 X |
| 4,558,536 | 12/1985 | Dunsmoor | 49/454 X |
| 4,581,850 | 4/1986 | Simpson | 49/446 X |
| 4,869,766 | 9/1989 | Pate et al. | 156/244.24 X |
| 4,993,188 | 2/1991 | Erickson et al. | 49/454 X |
| 5,119,592 | 6/1992 | Westfall et al. | 49/454 |

*Primary Examiner*—Philip C. Kannan
*Attorney, Agent, or Firm*—Wolf, Greenfield & Sacks

[57] ABSTRACT

A window assembly has a sash vertically movable within a window jamb and positioned in the jamb by elongated side guide tubes enclosing counter balance means and resiliently biased partially into engagement with side ploughs of said sash, with the guide tubes extending outwardly from channels provided in opposed side jamb members. The guide tubes prevent lateral displacement of the sash as the sash is positioned within and moves from a window open to a window closed position within the plane of the jamb. The guide tubes can be reciprocally and resiliently compressed into the channels to release the ploughs and sash whereby the sash can be removed from the window construction.

26 Claims, 8 Drawing Sheets

REMOVABLE SASH WINDOW CONSTRUCTION HAVING RELEASABLE GUIDE MEMBERS

This application is a continuation of application Ser. No. 07/989,159, filed Dec. 11, 1992, now abandoned which is a continuation of application Ser. No. 07/611,993, filed Nov. 9, 1990 now abandoned.

BACKGROUND OF THE INVENTION

A wide variety of window constructions for both original and replacement windows are known in the art. Such windows include single-hung, double-hung and casement window constructions for use in residential as well as other building constructions. Among the older double-hung designs are wood sash window assemblies where the sashes are non-removable and connected by the jambs along the full height of both sides of the sash. Advantages of this system include good wind load resistance and means for providing good air infiltration resistance properties to the window.

However, more modern double-hung window constructions provide for ease of removal of the sash for cleaning purposes and to allow entrance and egress to construction through the window jamb. Such constructions include conventional double-hung tilt sash constructions well-known in the industry. Such windows have the advantage of ease of sash removal. However, in many cares, because each sash is connected to the jamb at four points via the tilt bars at the bottom and two tilt latches at the top, wind load resistance is decreased over non-removable window constructions. Moreover, such window constructions cause greater air infiltration during high wind load conditions. The problem is particularly pronounced in P.V.C. window constructions where overall mechanical strength may be lower than some wood or metal window designs, such as casement constructions. Such P.V.C. window constructions further often have an undesirable plastic look rather than the more acceptable wood grained appearance. A number of overlays and wood surfacing techniques have been devised but such materials do not enhance mechanical strength features in comparison to other constructions.

SUMMARY OF THE INVENTION

It is an object of this invention to provide a window construction which has high wind load resistance properties, yet allows for ease of removal of at least one sash member by the use of guide members for opening and closing the sash, which guide members can carry counter balance means and can be moved from operative relationship with the sash to permit removal or replacement of the sash in use.

It is another object of this invention to provide a window construction in accordance with the preceding object which facilitates low air infiltration values, high wind load resistance values in a relatively simple construction which can be made by substantially conventional manufacturing procedures at reasonable cost.

Still another object of this invention is to provide a method of forming a high wind load resistant window construction having ease of sash removal by the use of resiliently positioned guide means carrying counter balance means.

Still another object of this invention is to provide a window construction having a plurality of corner joints which can have dissimilar profile mating materials which joint is formed by electromagnetic welding with the use of an insert piece of magnetic material.

Still another object of this invention is to provide means and methods for attachment of extension jambs and a real wood interior which can be stained or painted.

According to the invention, a window construction having high wind load resistance and ease of mounting and dismounting a sash within a window frame has a fixed frame defining and elongated first and second side jamb each having an elongated axis and an inner surface. The sash defines first and second stiles or side members lying within the first and second jambs respectively and mounted for movement axially of the first and second jambs to a window open position and a window closed position. The stile side members each have an axial length less than the axial length of the first and second jambs and form sides of a window sash preferably of generally rectangular or square shape. A guide member having an elongated axis extends between one of said stile members and one of said jambs to mount said sash for movement to the open window position and closed window position. In the preferred embodiment, two such guide members are provided on either side of the sash.

The guide members are each mounted in an elongated channel extending inwardly from the inner surface of a jamb and having a cross-section extending out from the jamb and are resiliently biased by resilient means to an outer sash supporting position. The guide member is positioned partially within a plough formed by a portion of the first stile. The plough faces towards the first elongated channel so as to receive a portion of the guide member which resiliently is biased out of the channel into position against the plough. The sash is preferably counter-balanced for sliding into the open or closed window position within the window assembly side jambs. A counter balance is mounted within the guide member for holding the sash in various locations between the open and closed positions. Preferably, means are provided for weatherproofing the guide member to provide air infiltration resistance. The channel and resilient means are dimensioned and selected to permit retraction of the guide member into the channel so that the sash is unobstructed by the guide member and can be removed from the frame when desired. Preferably, the guide member itself is removable from the channel for ease of replacement and adjustment of the guide member and/or the counter balance which is carried within the guide member.

The invention further comprises a window construction having high wind load resistance which is improved by the use of a joint formed between a window jamb and window sill or window header or other window construction parts having similar or dissimilar mating ends. The mating ends are positioned in juxtaposition to each other with a magnetizable welding gasket positioned therebetween. The ends are then joined to each other through the welding gasket by electromagnetic welding to form a mechanically strong welded joint having similar or dissimilar profiles welded together. In some cases, the profiles can be similar and the ends can be adjoining ends of a sash construction or jamb construction.

It is a feature of this invention that extremely high wind load resistance can be obtained. Such wind load resistance can be above grade 40 and preferably above grade 60 under NWWDA standards, that is at least 40

PSI of plus or minus pressure measured at a sustained wind of about 126 miles per hour. In addition, air infiltration resistance can be provided for by weather sealing or air infiltration means to obtain an air infiltration value lower than 0.1 cubic feet per minute/per foot of sash crack parimeter around the sash plus meeting rail and more preferably below 0.05. The windows of this invention provide superior performance in wind load and air filtration problem conditions. Since the jamb is fixed and the sash is maintained by an elongated guide tube extending over and supported by a substantial elongated surface, high wind load resistance can be obtained. Moreover, since there is a plough and tube arrangement which need not seal, weather stripping can supplement air sealing to provide improved air infiltration performance. The spring or resilient means used to position the guide tube can also form an air infiltration barrier when organic foam is used, although other air infiltration barriers can be provided, if desired. In many cases, the advantages of conventional removable sash windows of the PVC (polyvinyl chloride) or other plastic frame type are retained while the strength and mechanical features of non-removable-sash wooden or metal windows is simultaneously obtained.

BRIEF DESCRIPTION OF THE DRAWINGS

The above and other objects, features and advantages of the present invention will be better understood from a reading of the following specification in conjunction with the accompanying drawings in which.

DESCRIPTION OF PREFERRED EMBODIMENT

Figure 1:
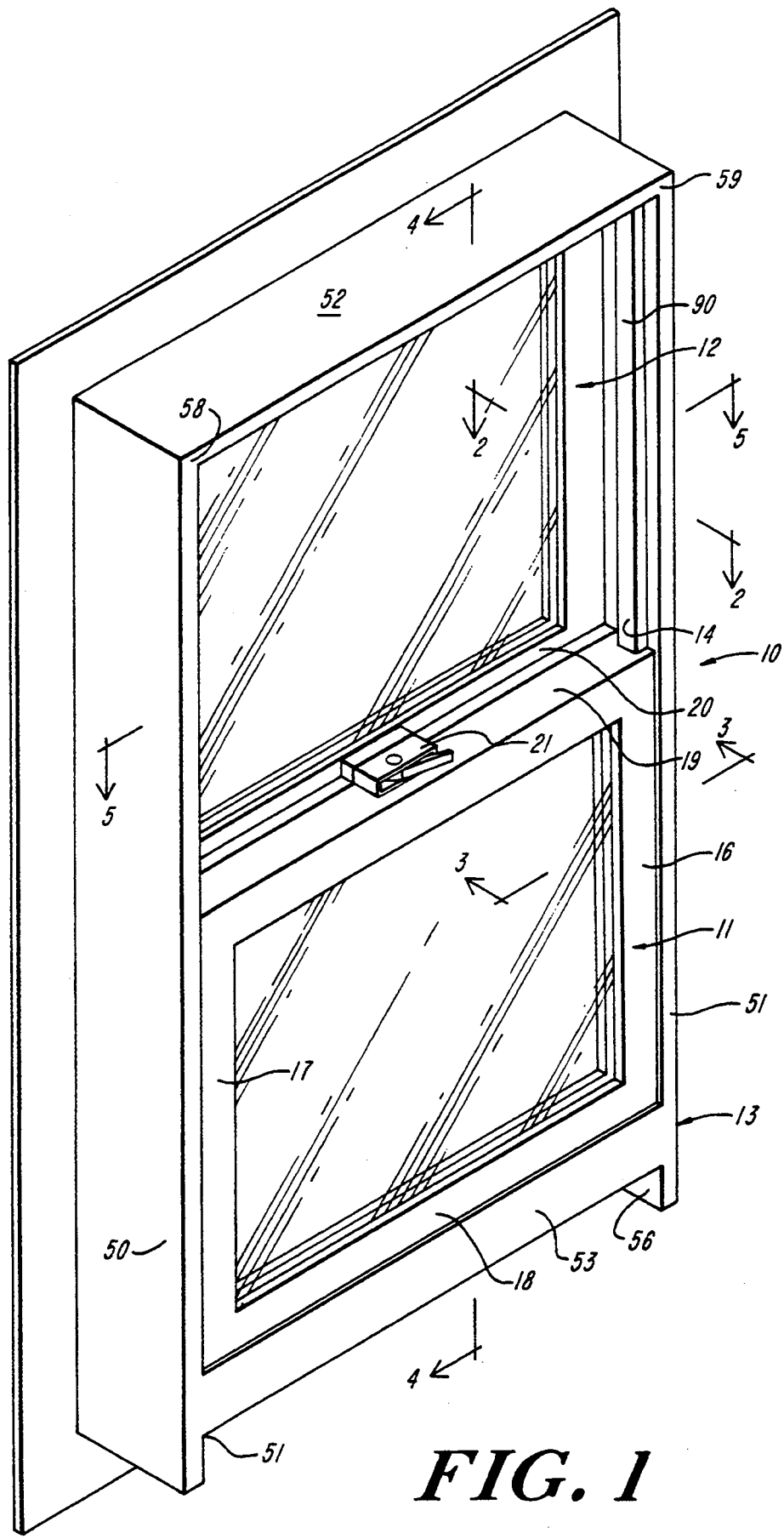
FIG. 1 is a rear plan view of a generalized window construction in accordance with a preferred embodiment of this invention.
Figure 2:
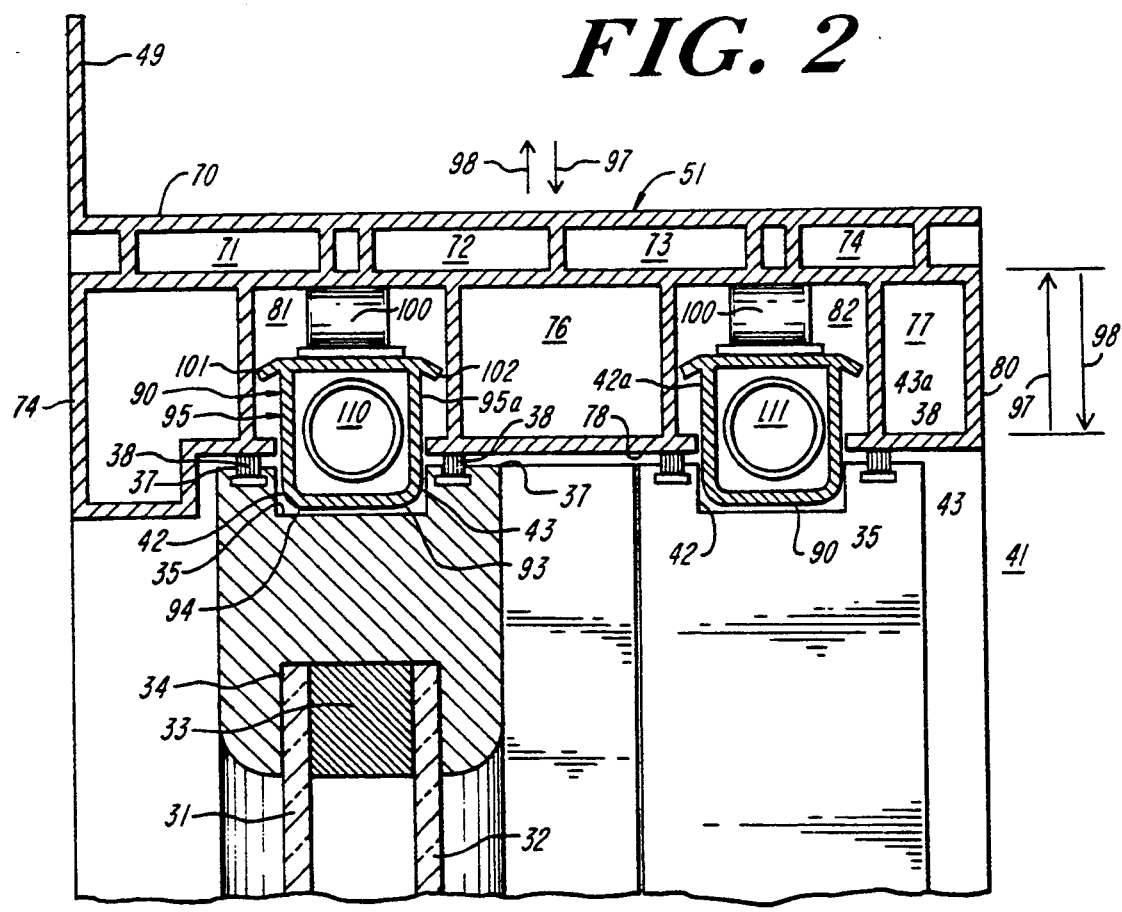
FIG. 2 is a cross-sectional view through line 2—2 thereof showing a first preferred embodiment.
Figure 3:
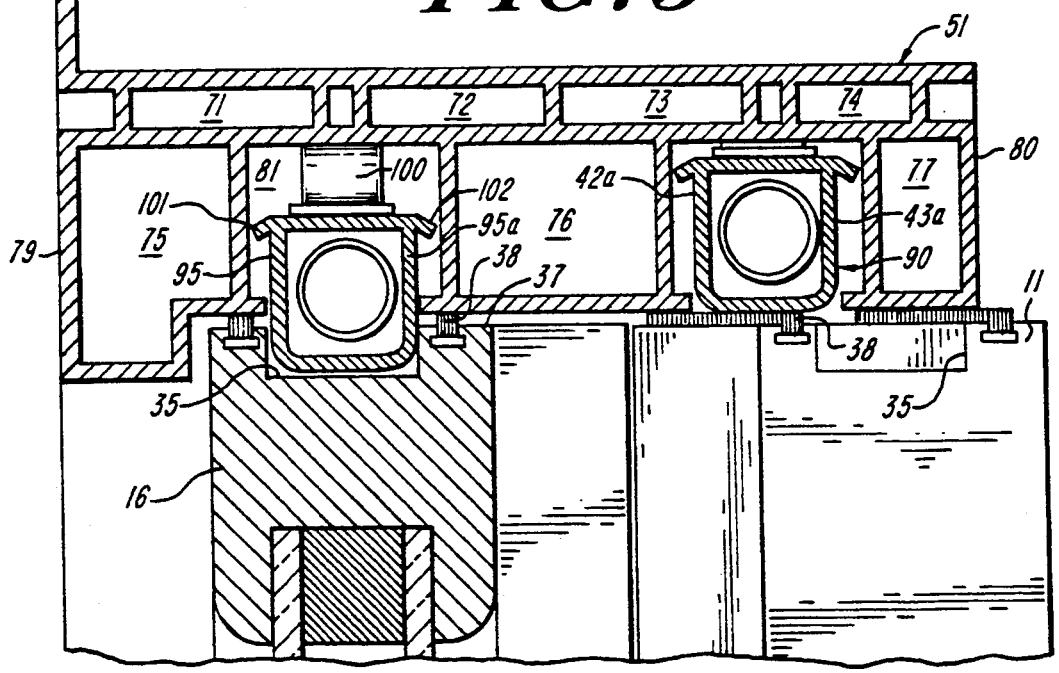
FIG. 3 is a view similar to FIG. 2 but showing a lower sash partially removed from the jamb or frame of the window.

With reference now to the drawings, a window construction 10 of generalized semi-diagrammatic form is shown in FIG. 1 comprising a lower sash 11, an upper sash 12 lying within the plane of a frame or window jamb 13 mounting the sashes for vertical movement to opened, closed or intermediate positions. The sashes are of a double-hung construction and are mounted within the frame and retained in place therein by a plurality of guide members 14, one of which can be seen in FIG. 1. While only the right side jamb 51 is shown in FIGS. 1–3, the left side jamb and associated structures are identical thereto.

The overall materials of the frame and sash can be wood, plastic, metal or combinations thereof, although plastic members having attached wood facings for certain aesthetic surfaces are preferred. Polyvinyl chloride or other know plastics can be used as conventional in the art.

Figure 5:
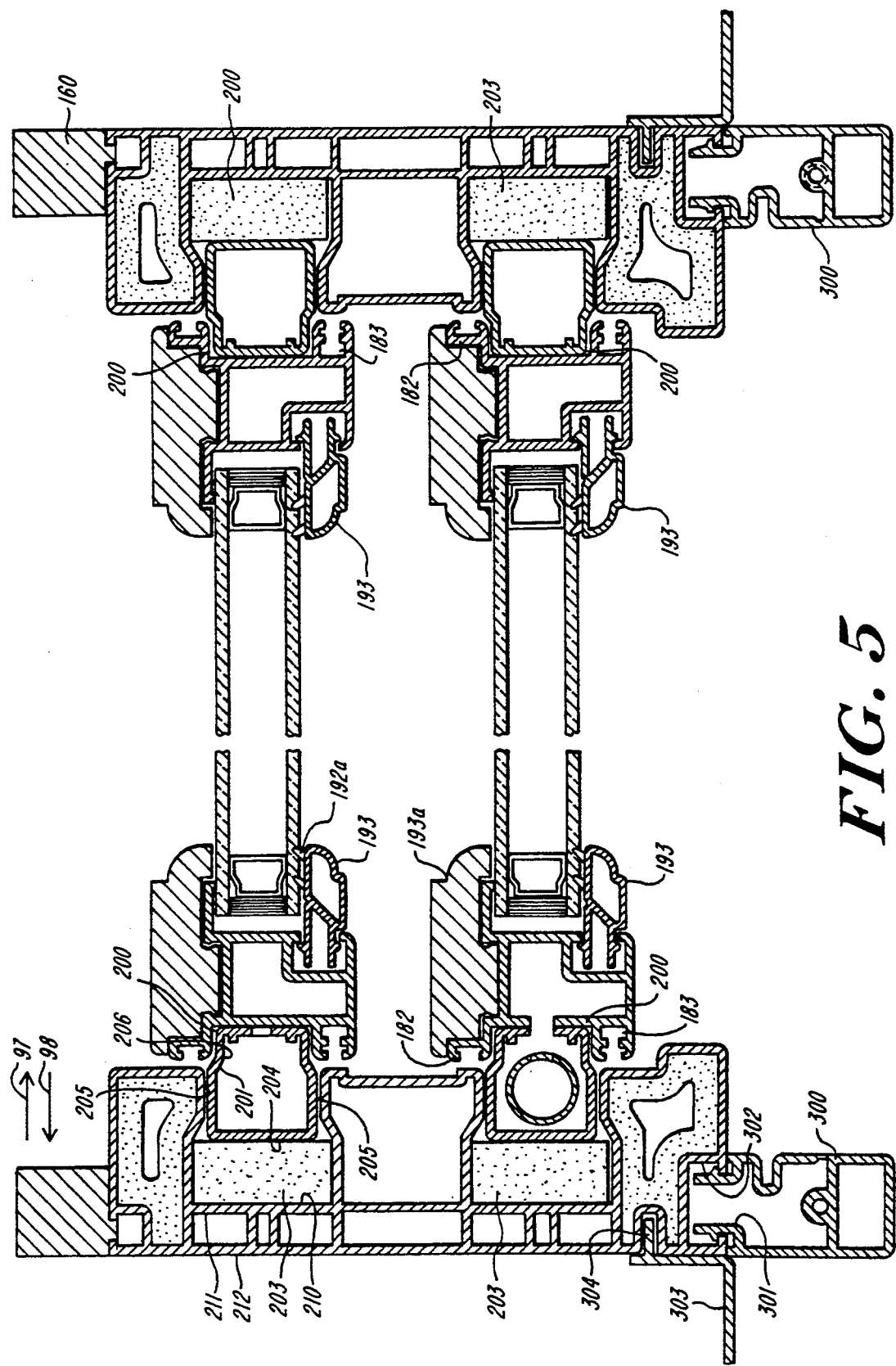
FIG. 5 is a cross-sectional view through an alternate embodiment taken through line 5—5 of the generalized overall view of FIG. 1.

Each sash member can be of substantially conventional design having stile side members 16 and 17 axially extending in a vertical direction with a bottom or lift rail 18 and a parallel lock rail 19 meeting with a keep rail 20 forming a meeting rail and check rail construction of the top and bottom sash. The top sash is substantially the same as the bottom sash as known. A conventional locking arrangement 21 has a portion mounted on the lock rail 19 to mate with an adjacent portion mounted on the keep rail 20 and can be a conventional angular metal push lever construction as known in the art. Each sash member preferably has a double glaze as shown in the embodiment of FIG. 2 with glass panels 31, 32 spaced by a plastic or metal spacer 33 mounted within a continuous rectangular recess 34 of the sash. Each of the sashes of this invention have side ploughs 35 which may be formed by an elongated channel or groove vertically mounted on the stile side members as shown in FIG. 2 or by plastic walls of a cross-section as shown in the embodiments of FIG. 5. In each case, provision is made for an outer vertically extending surface 37 to carry conventional resilient brush, felt, wool or other air infiltration brush or contact members 38 of a weatherstrip type well-known in the art. These brush members 38 are disposed on various surfaces but, preferably provide for air infiltration resistance between the outside or front of the window construction 40 and the inside or rear of the window construction 41. The weatherstrips or brush constructions extend vertically on the parallel stiles of the top and bottom sash, as known in the art. The plough 35 of each stile side member has parallel walls 42 and 43, which walls provide a solid surface to mate with the substantially rigid side surfaces 42a, 43a of the guide tubes, thus, providing substantial wind load resistance against a force applied to the window by wind from the front 40 pushing toward the rear 41 or vice versa.

In a conventional window construction, the bottom sash can have a side-to-side dimension of about 42.6 inches with a top-to-bottom dimension of about 44 inches in a glass area of approximately 1397.3 square inches. In some cases triple pane or single pane constructions can be used, if desired. Obviously, the different portions of the window construction can be varied so as to use wood sash members and plastic jamb members or vice versa. Plastic is preferred because of its light weight, durability, weather resistance and cost.

Figure 7:
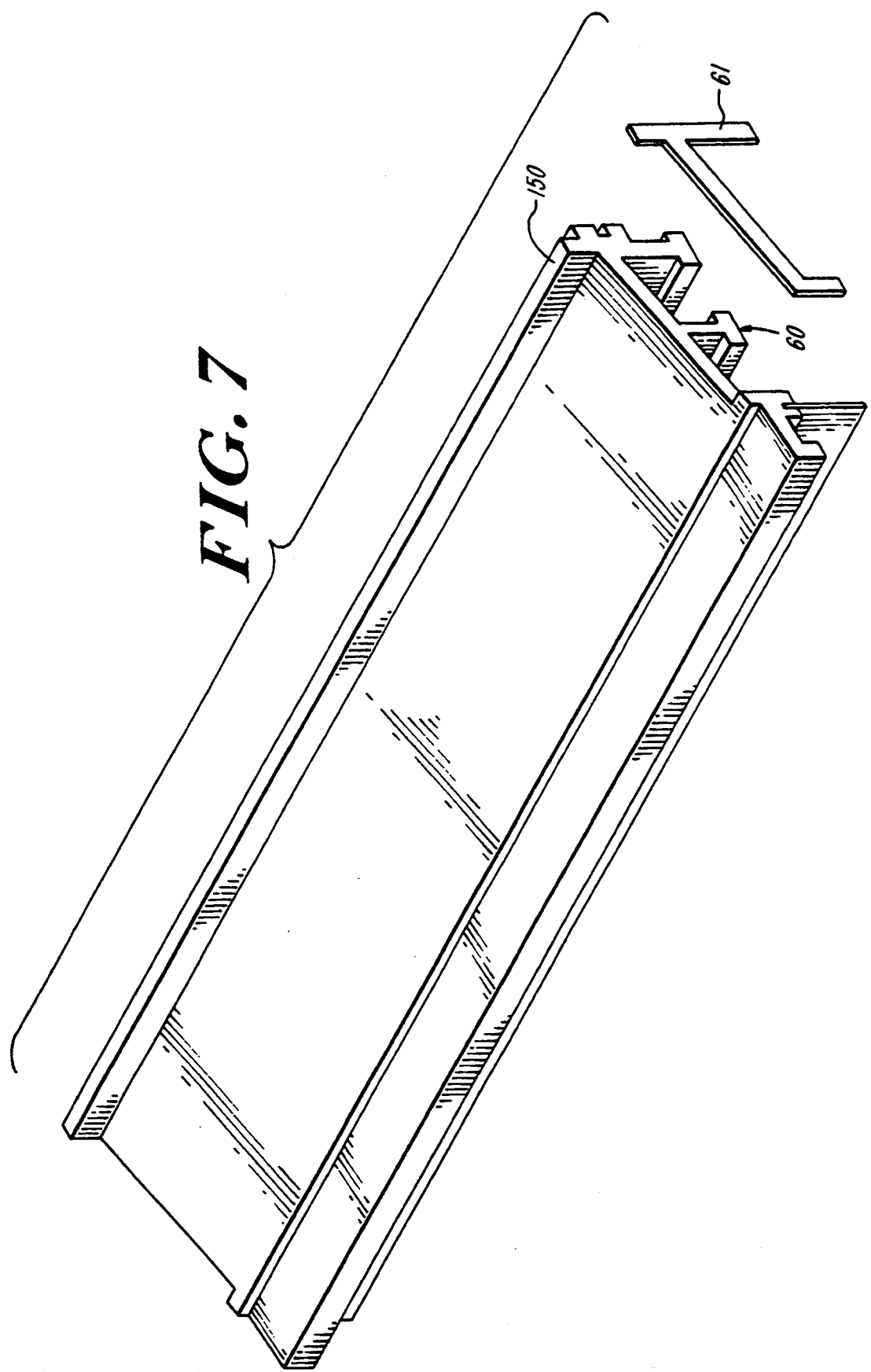
FIG. 7 is an exploded view of a sill corner joint formed in accordance with a preferred embodiment of this invention.

In the embodiment of FIGS. 1 and 2, the first and second jamb side members 50 and 51 are of a plastic construction and have an outer peripheral nailing flange 49 extending about the frame or jamb construction and integral with the top and bottom jamb members 52, 53. The bottom jamb member 53 forms a sill as will be described. The corners or joints 56, 57, 58 and 59 are preferably formed by an electromagnetic joining method using an insert of an EMA gasket conformed to the shape of at least one end. For example sill end 60, shown in FIG. 7 is positioned with insert gasket 61 conforming to the overall shape and acting as an insert between the sill and the side jamb 51. Emaweld, a trademark of Emabond Systems of Norwood, N.J. (a subsidiary of Ashland Chemical), techniques are preferably used. The use of electromagnetic welding to form joints in plastic corners of window constructions is believed novel and has been found to provide outstanding rigid constructions having high strength. Basically, electromagnetic welding uses the principles of inductive heating to create fusion temperatures within a joint area. A magnetically active material in the form of the flat insert such as 61 utilizes a thermoplastic material in a gasket which is similar to plastic material used for the parts being mated and has ferromagnetic particles within a thermoplastic matrix. When placed between joint interfaces and briefly exposed to oscillating magnetic fields, which fields are developed by a set of conductive work coils through which a high frequency alternating electrical current flows, fusion temperature is achieved quickly to form extremely strong bonds between the two mating parts and the gasket, while allowing for substantially perfect alignment of the joint ends being joined or fused together. The technique is fast, reliable and is particularly useful in window constructions. The plastic used can vary greatly and can include window constructions of PVC, ABS, polycarbonates, polypropylene, polystyrene and impact mixtures thereof, as well as other thermoplastic materials.

The Emabond technique has been found to be particular useful in window constructions, at least partially, because the joint ends can be dissimilar in design, while still allowing formation of extremely strong joints when a welding insert made of basically the same plastic material is positioned between the ends and electromagnetically welded at the joint. Thus, dissimilar profiles can be used at the joints, such as when attaching a sill to a side jamb or similar profiles can be used as when two similar ends are to be attached together. Dimensional stability can be easily provided for unlike more conventional fusion methods commonly used in the art of fusing mitered joints of plastic components in a window jamb. Preferably the plastics are solid plastics, however, plastic foams can be joined or cross-sections of foam and solid co-extruded plastics can be joined by the preferred method of this invention.

The vertically mounted parallel first and second side jambs 50 and 51 can have the cross-section shown at 51 in FIGS. 2 and 3. The nailing flange 49 is integral with an outer double wall 70 which has compartments 71, 72, 73, 74 and smaller compartments from front to back which enable a strong construction having insulating space and high strength contributed to by webs attaching the parallel portions of wall 70, without the high cost of a solid plastic. The principle of honey-combing or hollow provision is further carried out at 75, 76, 77 spacing the inner surface 78 of the jamb from the outer wall 70. Front and back walls 79, 80 are preferably parallel to each other as are the inner and outer walls 70, 78. Each side jamb has a vertically extending channel 81 for mounting the top sash and a second vertically extending channel 82 located to mount the bottom sash for vertical reciprocal movement within the frame as known in the art.

The channels 81, 82 of the embodiment of FIG. 2 mount the novel and inventive guide means 90 of this invention. The guide means 90 in the embodiment of FIG. 2 is an elongated tube preferably formed of plastic of a rigid nature which extends substantially from top to bottom of the channel opening provided by the jamb. Four guide tubes are used, one on either side of each of the sashes, each mounted within corresponding ploughs of the sashes, provided in the parallel side member stiles of each sash. Note that the guide tube 90 and associated construction is substantially the same in each of its four embodiments and, thus, only one will be described with respect to FIG. 2. The guide tube 90 has a generally rectangular cross-section with rounded corners 93, 94 to facilitate sliding. Opposed parallel side walls 95 and 95a mate with and reciprocate in the direction of arrows 97, 98 against the resilient biasing of a resilient means in the form of a spring 100 which is a flat leaf spring biasing the tube to the position shown in FIG. 2. Wings 101, 102 on the guide tube are used to maintain the guide tube within the channel 81 at all times. In some cases, these wings can be resilient, allowing the guide tube to be withdrawn from the channel if desired. As will be seen from FIGS. 2 and 3, the guide tubes each mount a spiral spring counter balance diagrammatically shown at 110, 111, each of which is preferably identical. The channel within the guide tube vertically extends a sufficient distance to mount a conventional spiral spring counter balance or other counter balance of known type. For example, block and tackle balances or the like can be mounted within the tube. A spiral spring guide tube is preferred to enable ease of removal when it is desired to replace the balance and ease of attachment with simple adjustment of spring power, as will be described.

Figure 6:
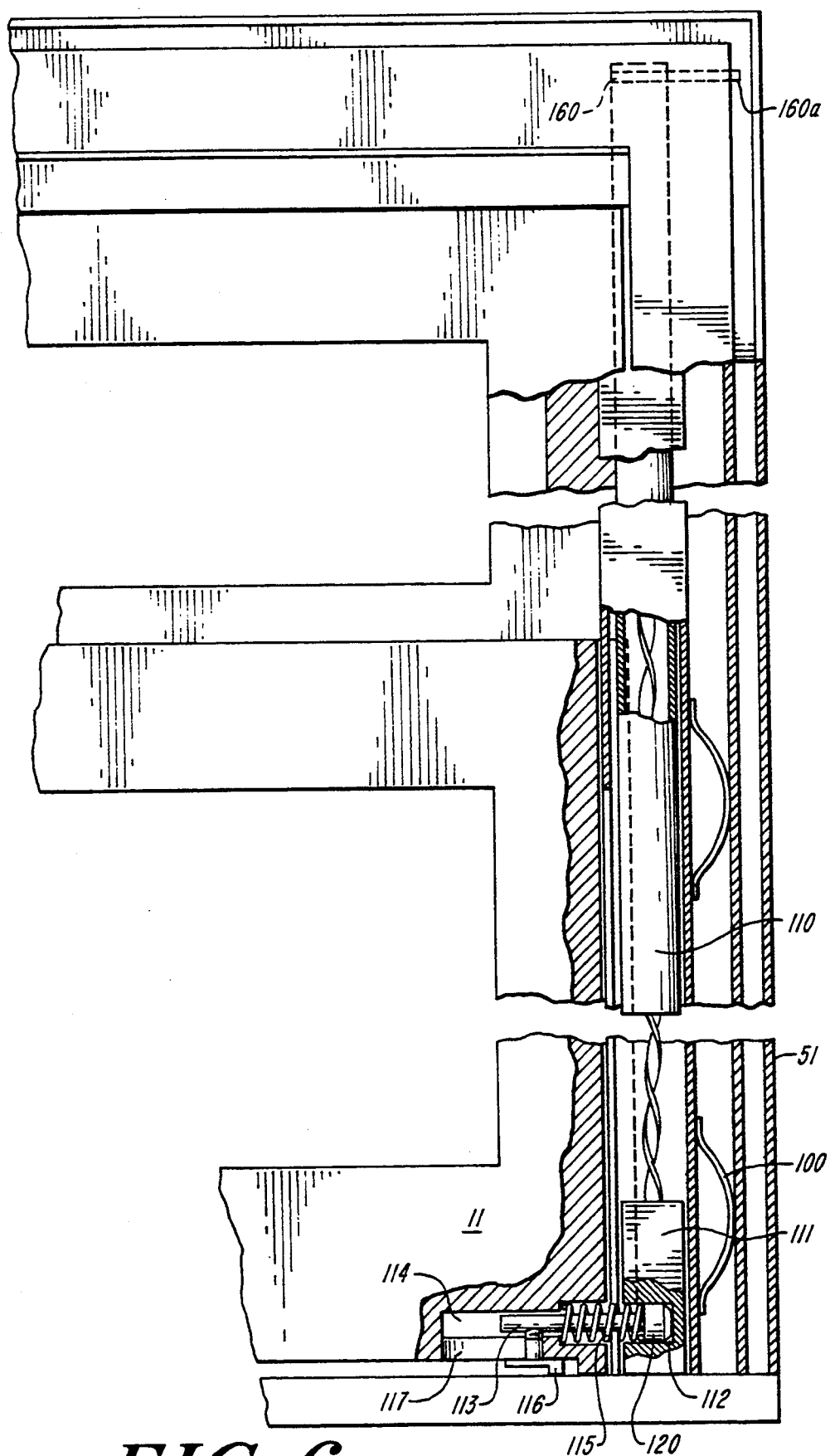
FIG. 6 is a semi-diagrammatic partial cross-sectional view showing a spiral spring counter balance inside the guide tube of this invention in the embodiment of FIG. 2.

With reference to FIG. 6, the spiral balance 110 is of known construction and has a block 111 with a recess 112 which receives a conventional guide pin 113 having an enlarged head 120 which mates with the recess 112 to interlock the sash with the spiral balance. The spring 115 allows a conventional finger pull 116 to move the pin into and out of engagement with the spiral balance through the keyhole 140 suitably provided in a slot such as 141 of the guide tube. Thus, the pin and sash can move throughout the vertical length of the slot 140 and the pin can be withdrawn and totally disengaged from the guide tube by use of the keyhole end 140.

Figure 8:
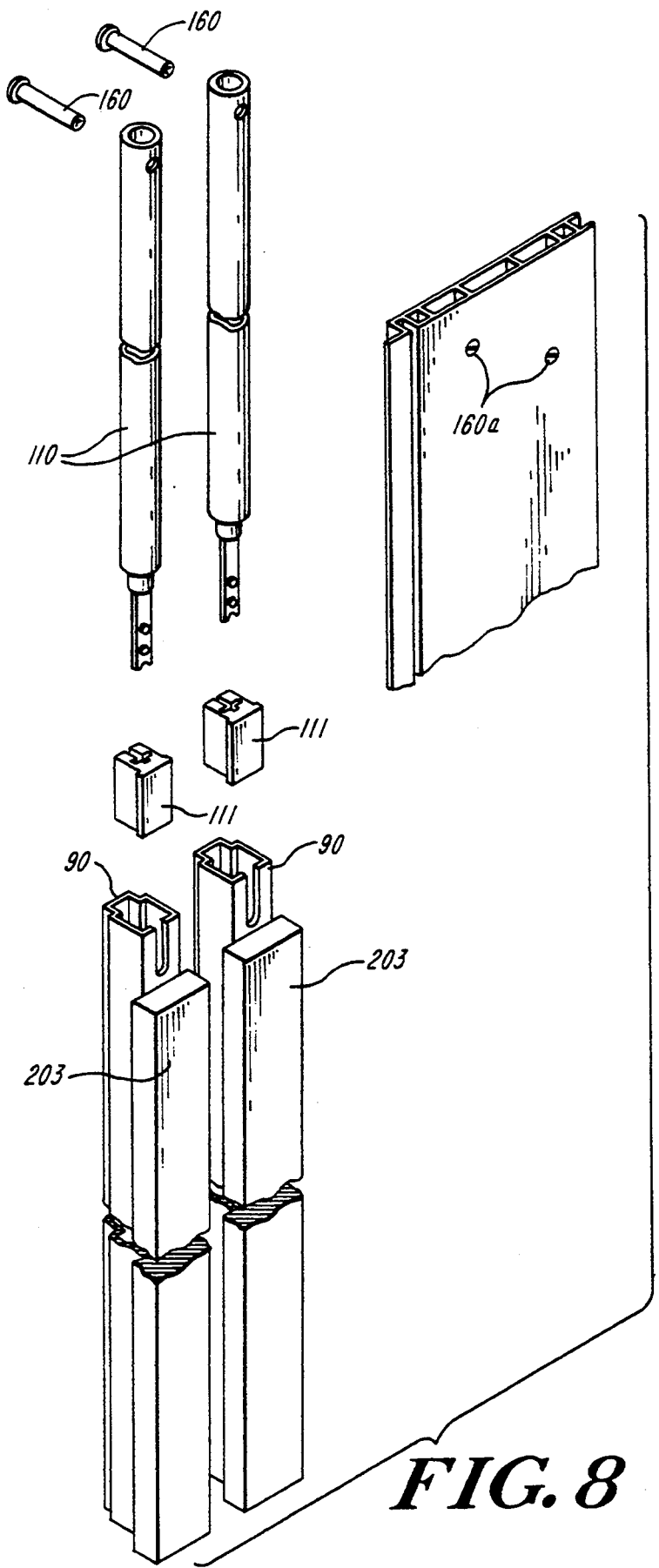
FIG. 8 is an exploded view of a guide tube, cushioning means, spiral balance and jamb section in accordance with a preferred embodiment of this invention.

The upper end of the spring loaded counter balance as best shown in FIG. 6, has a balance adjustment pin of conventional design 160. The balance adjustment pin 160 fits within a bore 160a provided in the jamb as best shown in FIG. 8. Thus, in use, should the spiral balance fail, the guide members can first be reciprocated to their innermost position within the jamb to remove the window or sash after which the guide member can be moved outwardly of the channel and the pin is automatically withdrawn from its mounting bore 160a in the jamb channel which mounts the tube. The entire spring counter balance can then be replaced by sliding it out one of the open ends of the guide tube, or alternately, its force adjusted by conventional means of adjustment of the spiral spring, whereupon the balance can be returned to the guide tube, and again mounted in position. It will be appreciated that the counter balance is preferably wholly enclosed within the guide tube for substantially all of its vertical length, and is preferably removable, although it need not be removable. Removability is preferred to allow replacement at will with ease, unlike many prior window constructions.

Turning now to FIG. 3, the guide tube 90 on the innermost side of the window is shown manually depressed to its innermost position within the jamb, thus, allowing the bottom sash to be tilted or moved out of the window frame. The guide tubes on both sides of the sash are preferably so depressed resiliently against the force of springs 100. This tilt motion can be accomplished very easily by the fingers pressing against the rigid guide tube as, for example, the portion exposed as shown in FIG. 1 or when the window is slightly open, the lower most portion of the guide tube. Upon depression of the guide tube on either side of the window, the window is merely pushed forward. It may tilt around the pivot pins 113 on either side of the sash, but these pivot pins can be removed by use of the finger members 116, as known in the art.

The upper sash is preferably arranged to be removable in the same manner as the lower sash previously described.

Figure 4:
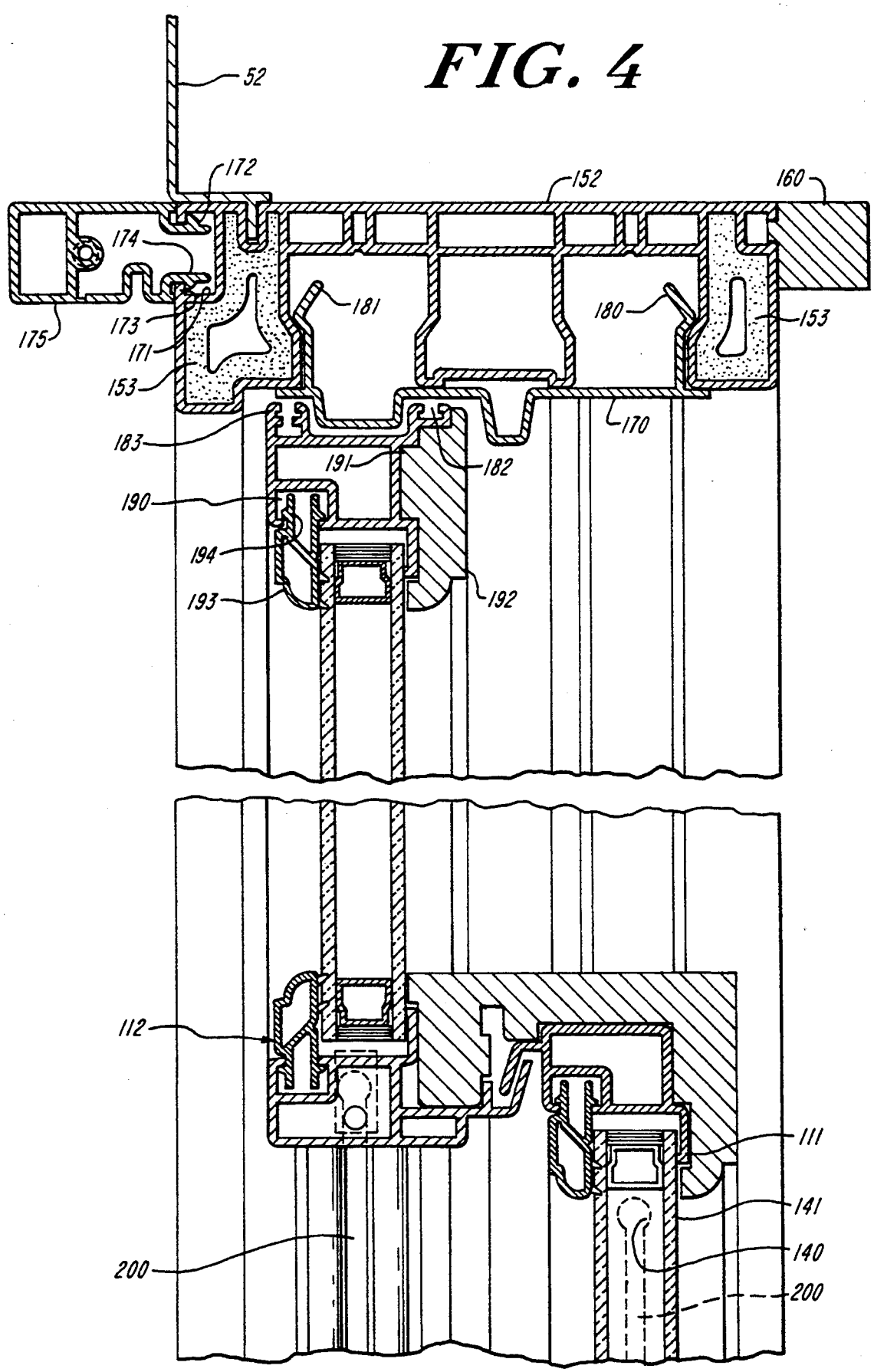
FIGS. 4 and 4A, respectively, are top and lower cross-sectional views of a preferred embodiment of a window construction thereof taken generally through line 4—4 of FIG. 1.
Figure 4A:
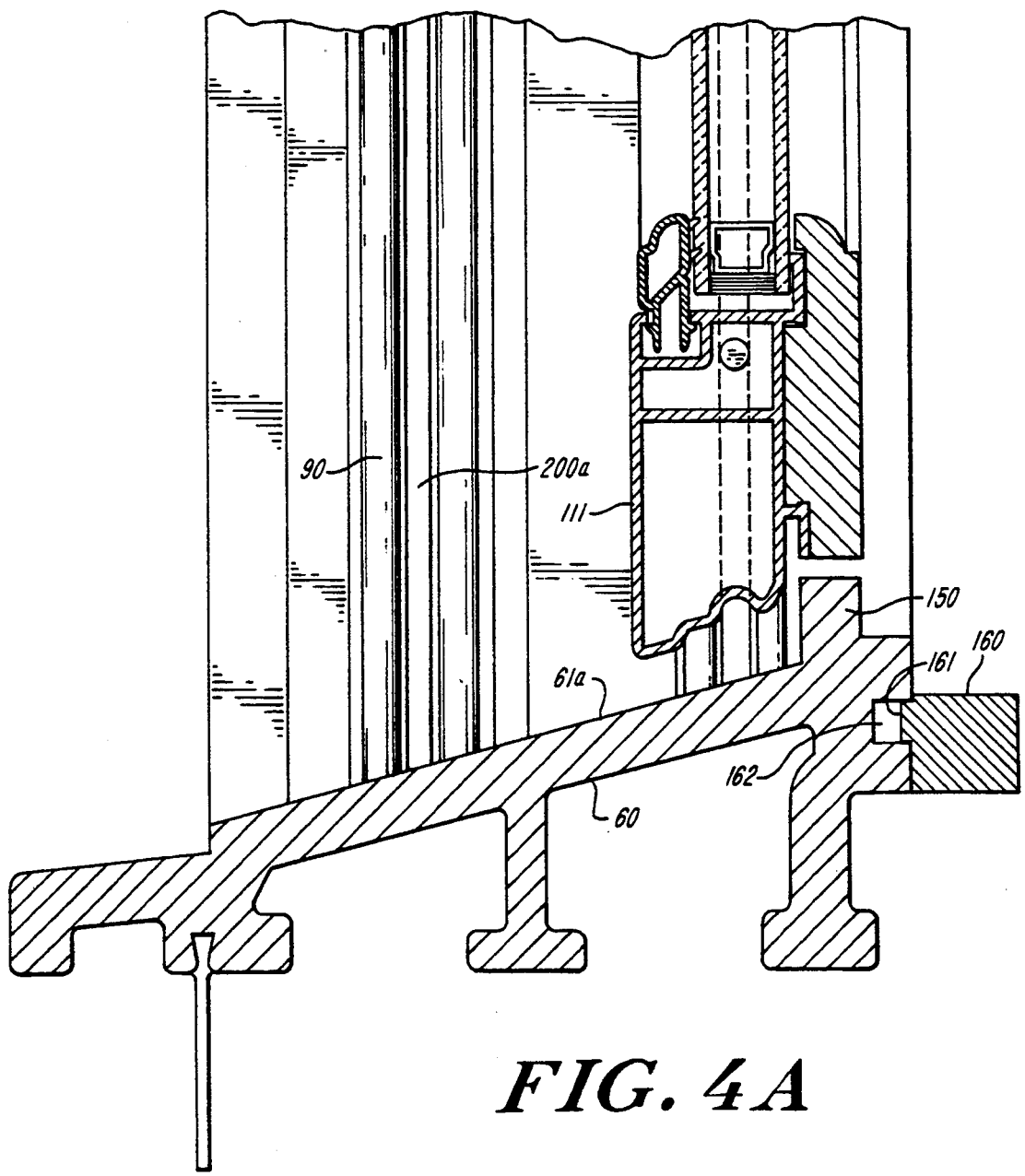

With reference now to FIGS. 4, 4a and 5, an alternate embodiment of the cross-sectional configuration of the sash and jamb are shown. In this embodiment, the sill 60 has a sloping surface 61 to receive the lower portion of the lower sash 111 or upper sash 112. The sill preferably has a uniform cross-section and is of a plastic material and has an upstanding side-to-side lip 150 to prevent water ingress into the interior of the building. An extension rail, or trim piece 160 is attached to the inner portion of the sill by a snap fit puppet-type connection 161 within a channel 162 of the sill. This extension member can go completely around the sill and acts to provide a nailing surface if desired or a surface for abutting against the interior wall of the house. In this embodiment, the structural members of the jamb such as top member 152 can have co-extruded vinyl or plastic foam 153 which adds to strength of the jamb and gives some nailing characteristics and structural rigidity to the jamb. In some cases the sill can be substantially formed of a rigid foam having a solid skin at its exposed surface. In cross-section, the top member 152 has a plurality of compartments and a covering top aesthetic insert or trim piece 170. The insert has spring fingers 180, 181 which enable the member to be snapped into corresponding recesses and form a top aesthetically pleasing surface for the inner portion of the top jamb member. The top jamb member further comprises channels such as 171 having inwardly extending lips 172, 173 providing a basis for snap fit of a resilient prong 174 carried by an aesthetic molding 175 which can be of plastic, wood or any decorative material. Alternately, the insert, such as 175, can have utility as when it forms an extension piece of the type at 160 or 300 (FIG. 5) for filling spaces in wall thickness or the like. Extension piece 300 extends from top to bottom of the window and has resilient prong 301 snap fit in re-entrant channel recess 302. The prong members 174,301 can be of a resilient plastic material so that it can be snapped in place with the opposing side walls depressed to release the snap when desired. Moldings, wood trims and facing members can be incorporated as desired.

The sash members such as the rails, as well as the stiles, can carry a brush weatherstrip (not shown) mounted in re-entrant recesses such as 182, 183 to mount air filtration brushes, wool, foams and the like to be resiliently compressed against mating surfaces of the frame or adjacent sash member. The top rail of the sash or window further carries recesses 190,191 to allow snap-in-place aesthetic coverings such as wood pieces 192 or a plastic glazing piece 193, each having either a compressible resilient prong such as 194 or an enlarged bulbular section 191 to allow resilient compression of the plastic of the sash member itself. In each case, these facing members 192 add to the aesthetic appearance of the window and can be used or not as desired. The members 192 can carry weatherstrip extensions 192a if desired.

Note that the guide members or tubes 201, as shown in FIG. 5, have a central slot 200a to enable the pin 113 to slide within the jamb as known in the art, while activating the spiral or block and tackle counter weight. Any counter weight means that fits within the guide tubes can be used and actuated by the pin.

In a single-hung window or other constructions, the guide member may be used without a counter weight therewithin, if desired.

In the embodiment of FIG. 5, the side stiles have ploughs 200 extending vertically and parallel to each other on each side, with a guide tube 201 of different cross-sectional configuration than the guide member 90. The guide member 201 has a cross-section such that there is a flat front 202 sliding within the plough 200 and resiliently compressed there against by a resilient foam block 203 which may extend the entire length of the guide member. Foam block 203 is preferably adhesively adhered to a rear flat portion 204 of the guide tube 201. The side walls of the guide tube comprise first flat portions 205 parallel to each other on either side of the tube and a second preferably narrowed portion 206 to enter the plough. The dimensions of the various portions can be varied depending upon overall window size as desired.

The organic foam used for the resilient elastically compressible or spring member can be of any known plastic or organic material such as PVC foam, polyurethane foam, rubber foam and the like. The foam provides for movement of the guide tubes in the direction of arrows 97, 98. Polyurethane foams are preferred, since they can give a required degree of resiliency and elasticity. Because the side-to-side dimension, as shown in FIG. 5, of the foam, exceeds the width of the guide tube or the distance between re-entrant facing walls 205, and because the foam block is adhered to the surface 204, the foam block will tend to maintain the guide tubes within the channel 210 of the side jamb 212 of this embodiment. However, when it is desired to remove the guide tube, it can be merely pulled out of the channel, since the foam is elastically yieldable and deformable. When it is desired to reintroduce the guide tube, it can be positioned adjacent the re-entry mouth of the channel 211 and merely depressed to compress the foam and bring the guide tube back to the position shown in FIG. 5. The foam maintains its position and allows sliding of the sash over of the guide tube, while resiliently keeping the tube in contact with the sash. Mere hand pressure is sufficient to compress the guide tube against the foam and thereby actually reduce the overall side-to-side dimension of the foam and allow it to be withdrawn so that the sash can be removed from the window. Of course, each of the foam blocks as shown can be of identical material. In some cases, combinations of springs and foam can be used. The use of the foam is particularly desirable since it aids in sealing against air infiltration. The parallel side walls 205 in conjunction with parallel facing and contacting guide walls at the re-entrant mouth of the channel, provide large, flat surfaces which in turn provides good strength against wind load on the window. Because the surfaces 205 can be wide, and the plough can be dimensioned to provide wide facing surfaces with the guide tube, and the rigidity of the tube can be designed as desired, very high wind load resistances can be maintained in desired constructions.

In the preferred embodiment of FIG. 5, the foam forming the spring means can be open cell polyurethane foam produced by Duraco, Inc. of Chicago, Ill. and having a density of 1.9 lbs/cm ft. (ASTM D-3574) tensile strength 15 p.s.i. (ASTM D-3574) elongation 180%, 25% compression deflection=0.45 p.s.i. and the compression set is 10% all by (ASTM D-3574).

The embodiment of FIG. 5 further shows extension pieces such as 300 of plastic material having a snap-in double-walled prong 301 mating with a recess 302. Similarly, flanges such as 303 can be provided with snap-in or glued prongs 304 for attachment to the plastic side jamb. The pieces 193, 193a as previously described provide aesthetic appearance to the sash. Trim pieces 193 and 193a can have various cross sections, lengths and widths to provide spacing and/or esthetic appearance as desired. Note that an overall wood window look can be obtained, by the use of snap-in inserts, while high mechanical strength is maintained. Veenering can also be used to provide an overall wood look.

High mechanical strength is further maintained by the use of the Ema bond as previously described.

While specific embodiments of this invention have been shown and described, many, many variations are possible, as will be obvious to those skilled in the art.

The particular spring means used for resiliently urging the guide tubes against the ploughs can vary greatly. The spring pressure is sufficient to maintain the guide tube in place, yet allow the guide tubes to be resiliently compressed so as to allow ease of removal from the window jamb. The windows are supported in a conventional position by conventional counter balance and jambs. In some cases, the means for moving the guide tube from window mountings to window removal positions may be in the form of fixed constructions for merely moving the guide tube from a first position shown in the position of FIG. 2 to a second position shown in the position of FIG. 3 where the guide tube is retracted and vice versa by fixed positioning means not shown. Resilient means are preferred, particularly since they can aid in adding to the air infiltration values of the window.

The particular aesthetic clip-on portions and functional portions used with the windows of this invention can vary greatly. In the preferred embodiment, the clip-on feature is by means of plastic opposed walls having re-entrant prongs which clip into restricted entrance offices of the jamb or sash assembly. Other attachment means can be used.

While spiral counter balances are preferred, other known counter balance techniques can be used. It is preferred that the guide tube be removable for ease of replacement of the counter balance and guide tube. However, this feature need not be included to obtain the advantages of ease of removal and high strength good infiltration windows of the present invention. It is preferred that the guide tube function as a balance carrier, wind load resistance mechanism, at the least, and preferably as a portion of a tilt device to allow ease of removal of the window. The entire window system can be adjusted easily for removal or replacement of the windows. Balances can be easily changed or adjusted without the need for special tools. Aesthetics can be outstanding as desired by the use of the attachable features and, in general, many significant advantages of old wood windows, tilt sash windows and the like can be achieved to a high degree in the construction of this invention.

What is claimed is:

1. A window construction having high wind load resistance and ease of mounting and dismounting a sash within a frame,
    said construction comprising a fixed position frame defining elongated first and second side jambs, each having an elongated axis and an inner surface,
    a sash defining first and second stile side members each having an elongated axis and lying within said first and second side jambs, respectively, and mounted for movement axially of said first and second side jambs to a window open position and a window closed position,
    said stile side members having an axial length less than the axial length of said first and second jambs,
    said stile side members forming sides of a window sash,
    a guide member having an elongated axis and extending between one of said side members and one of said side jambs to mount said sash for movement to said open window position and closed window position,
    said guide member being removably mounted in an elongated channel extending inwardly from said inner surface of said first jamb and having a portion extending out from and resiliently biased by a resilient member to an outer sash supporting position,
    a plough formed by a portion of said first stile and facing towards said elongated channel so as to receive a portion of said guide member extending out of said elongated channel whereby said sash is supported for sliding into said open and closed position and positively supported against wind pressures,
    a counter balance mounted in said guide member for supporting said sash said counter balance being removable with said guide member for ease of replacement when desired,
    weatherproofing containing said guide member to provide air filtration resistance,
    said channel and resilient member being dimensioned and selected to permit retraction of said guide member into said channel whereby said sash is unobstructed by said guide member and can be removed from said frame.

2. A window construction in accordance with claim 1 wherein said channel defines spaced apart guide member guiding surfaces for allowing and supporting reciprocal movement of said guide member towards and away from said channel.

3. A window construction in accordance with claim 2 wherein said resilient member is positioned adjacent said guide member for permitting said reciprocal movement and comprises an organic foam material secured to said guide member which further provides air infiltration sealing means for said guide member.

4. A window construction in accordance with claim 3 wherein said organic foam has a width greater than the spaced apart guiding surfaces and aids in releasably retaining said guide member in said channel.

5. A window construction in accordance with claim 2 and further comprising said window construction being a double hung window having two sashes with each sash having a side guide member, channel and counter balance as set forth in claim 1.

6. A window construction in accordance with claim 1 wherein said guide member is spring biased by spring means.

7. A window construction in accordance with claim 6 wherein said spring is at least one leaf spring.

8. A window construction in accordance with claim 1 wherein said counter balance is a spiral spring counter balance.

9. A window construction in accordance with claim 1 wherein a channel, resilient member and guide tube are provided in said second jamb adjacent said second stile.

10. A window construction in accordance with claim 1 and further comprising pin means connected to said counter balance for allowing support balancing of said sash during axial movement thereof with respect to said first and second axes of said stile side members, said pin means being retractable to a position permitting removal of said sash from said jamb.

11. A window construction in accordance with claim 10 wherein said pin means is retractable into a stile.

12. A window construction in accordance with claim 11 wherein said guide member is an elongated tube having a slot therein permitting movement of said pin connected to said counter balance.

13. A window construction in accordance with claim 10 and further comprising aesthetically pleasing facing means attached to said sash.

14. A window construction in accordance with claim 1 wherein said window construction is a single hung window.

15. A window construction in accordance with claim 1 wherein said guide member has a tubular cross-section and said counter balance is wholly encased within said tubular cross-section and removable therewith.

16. A window construction in accordance with claim 15 and further comprising said guide member tubular cross-section including outwardly extending flanges positioned to retain said guide member substantially within said jamb channel.

17. A window construction in accordance with claim 1 and further comprising said window construction having a NWWDA wind load resistance grade of at least 40 PSI of positive or negative pressure measured at a wind of about 126 miles per hour sustained.

18. A window construction in accordance with the window construction of claim 17 wherein said window construction has an air infiltration value below 0.1 cubic feet per minute/per foot of sash crack (parameter around sash plus meeting rail), 19. A window construction in accordance with claim 18 wherein said wind load resistance NWWDA is at least 60.

20. A window construction in accordance with claim 19 wherein said air infiltration is below about 0.05 cubic feet per minute/per foot of sash crack (parimeter around sash plus meeting rail).

21. A window construction in accordance with claim 20 and further comprising aesthetically pleasing facing means attached to said sash.

22. A window construction in accordance with claim 21 and further comprising exterior trim members removably attached to said lamb.

23. A window construction in accordance with claim 18 wherein said sash is formed of plastic pieces joined together by electromagnetic weld joints.

24. A window construction in accordance with claim 23 wherein said jamb is formed of plastic and comprises at least one corner joint which is formed by electromagnetic welding with the use of an intermediate insert having magnetic means therein.

25. In a window construction having a removable and replaceable sash mounted in a window jamb, the improvement comprising, a hand removable guide member for guiding said sash to an open window or closed window position said guide member carrying a counter balance means for balancing said sash in a number of desired positions said counter balance being removable with said guide member for ease of replacement when desired, and means for positioning said guide member to prevent removing said sash from said jamb or to allow removal of said sash from said jamb, said guide member being constructed to provide said window construction with a NWWDA wind load resistance grade of at least 60 psi of positive or negative pressure measured at a wind of about 126 miles per hour sustained and an air infiltration below about 0.05 cubic foot per minute/per foot of sash crack (perimeter around sash plus meeting rail).

26. The improvement of claim 25 wherein said means is a resilient foam material.

* * * * *